Aug. 8, 1939.    N. F. AGNEW    2,168,786
REMOTE CONTROL SYSTEM
Filed Jan. 19, 1934    3 Sheets—Sheet 1

Fig. 1.

INVENTOR
Norman F. Agnew
BY
HIS ATTORNEY

Patented Aug. 8, 1939

2,168,786

UNITED STATES PATENT OFFICE 2,168,786

REMOTE CONTROL SYSTEM

Norman F. Agnew, Swissvale, Pa., assignor to The Union Switch & Signal Company, Swissvale, Pa., a corporation of Pennsylvania Application January 19, 1934, Serial No. 707,332

11 Claims. (Cl. 177—353)

My invention relates to systems for the control from a central point of selected devices at remote points, and for also indicating at said central point the condition of various devices at the remote points. Apparatus embodying my invention is particularly adapted for, though in no way limited to, centralized traffic control systems for railroads, in which traffic governing devices at spaced points along a railroad are controlled from a despatcher's office, and movements of trains and the condition of the governing devices are indicated in said office. In its specific embodiment, my present invention relates to a centralized traffic control system of the type which employs apparatus which is normally inactive but which when set into operation establishes communication between a control office and a plurality of field stations in turn during a single cycle of operation.

My present invention is an improvement upon the system disclosed in my copending application Serial No. 636,882, filed October 8, 1932, for Remote control systems. One object of my present invention is to provide an arrangement whereby the selection and control of the devices at the various field stations and their indication at the central office is accomplished over a single line circuit employing but one control wire and common and leading from the office to each station in turn. Other objects and features of my invention will become apparent as the description proceeds.

I will describe one form of apparatus embodying my invention, and will then point out the novel features thereof in claims.

In the accompanying drawings, Figs. 1 and 2 when arranged side by side with Fig. 2 at the right form a diagrammatic view illustrating one form of office equipment employed in a centralized traffic control system embodying my invention. Figs. 1, 2 and 3 when arranged side by side with Fig. 3 at the right, form a complete diagrammatic view of the system as it is arranged when employed to control apparatus at but one field station only. When the system is employed to control a plurality of stations, the apparatus at each station will be generally similar to that illustrated in Fig. 3, while at the office, a control panel containing individual control and indication devices will be provided for each station. One complete typical panel suitable for controlling and indicating the devices at a field station is illustrated in Fig. 2 by the apparatus included within the dotted line rectangle entitled "Panel I". A portion of a similar panel for controlling the devices at a second station is illustrated in Fig. 2 by the apparatus included within the dotted line rectangle entitled "Panel II". The diagrammatic view of the system may thus be readily extended to include the apparatus for controlling any desired number of stations by so arranging a corresponding number of copies of Fig. 3 side by side at the right of Figs. 1 and 2, as to extend the line wires X and Y from the office through each station in turn, and by inserting additional copies of the drawing of panel I in Fig. 2 at the right of the one shown therein, in place of panel II, so that the wires numbered at the left of panel I will extend through each panel in turn.

Similar reference characters refer to similar parts in each of the views.

The remotely controlled apparatus at the stations may be of any suitable form, but for purposes of illustration, the centralized traffic control system of my invention has been arranged in such a manner that it includes railway traffic controlling and indicating apparatus at a despatcher's office and railway switches and signals at various remote points within the territory controlled by the despatcher, and the system is arranged as a communication system to provide a continuous indication at the despatcher's office of the condition of each switch and of each signal for governing the movement of traffic over a switch in the controlled territory, and also to indicate the passage of each train through the territory, and to provide facilitates whereby an operator at the despatcher's office may operate the track switches and control the signals in order to govern the movement of trains through the territory. For purposes of illustration, the field station which I have illustrated in Fig. 3 includes a group of apparatus comprising a single track switch and the signals and associated apparatus for governing the movement of traffic in either direction over the switch. This apparatus forms no part of my present invention and so may be of any desired type such for example as shown in my prior application Serial No. 636,882, hereinbefore referred to, and for the purposes of the present application, it is deemed necessary to show only those portions of the railway signaling apparatus at the station which are directly related to the communication system. Thus, in Fig. 3, to illustrate the switch control, I have shown a polarized switch control relay WR, having polar contacts $a$ and $b$ which may be operated from one position to another to control the track switch to a corresponding position, provided traffic conditions are such that the switch may be safely operated as evidenced by the closing of a contact $a$ of a locking relay LR included in the control circuit of relay WR, and to illustrate the signal control, I have shown a pair of signal control relays LHSR and RHSR, one or the other of which may be operated to control the signal which governs the movement of traffic over the switch from left to right or from right to left, respectively.

Figure 3:
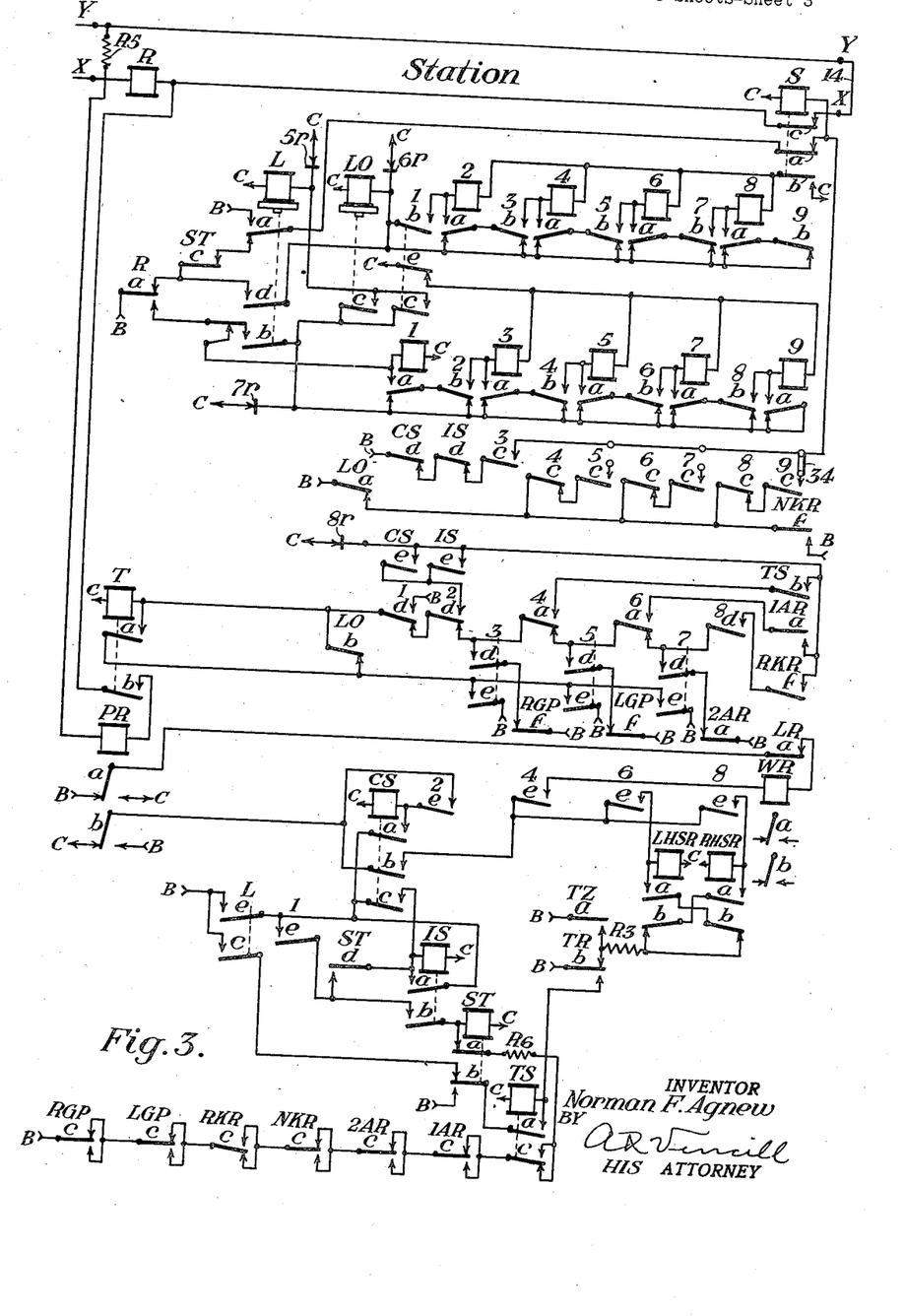
Fig. 3 illustrates the corresponding apparatus for one field station.

In addition to the switch and signal control apparatus, I have shown, in Fig. 3, control contacts of various railway signaling relays which govern the transmission of return indications from the field station to the despatcher's office. These relays are generally similar in function to those of similar designations illustrated in my prior application Serial No. 636,882, and include a pair of switch indication relays, NKR and RKR, one or the other of which is energized to indicate when the track switch has completed its movement and is locked in its normal or reverse position, respectively, and also a pair of signal indication relays, LGP and RGP, energized only when the signals governing traffic in the corresponding direction, left or right, respectively, are in the stop position.

Figure 2:
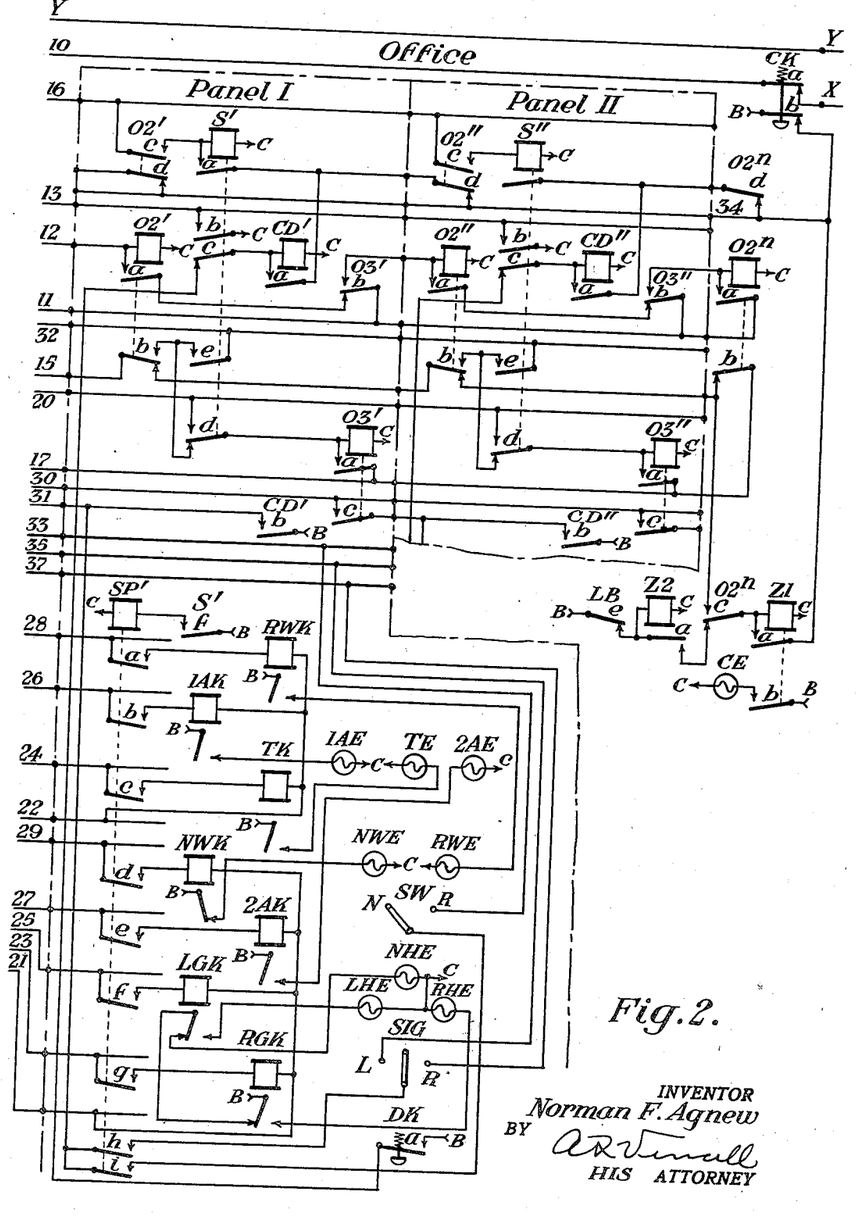

The track switch controlled by relay WR is to be understood as located in the usual detector track section having a track circuit including a track relay TR. A front contact $b$ of the relay TR is shown in Fig. 3, for controlling the stick circuits of the signal control relays LHSR and RHSR in conjunction with a contact $a$ of a slow acting repeater relay TZ of relay TR, while the back contact $b$ of relay TR is employed to control the transmission of indications of the condition of the detector track circuit through the medium of a stick relay TS. The apparatus of Fig. 3 also includes means for indicating the condition of two additional track circuits, which means may be employed to indicate the approach of a train within a predetermined distance of the switch from one direction or the other. As shown in Fig. 3, these additional indications are controlled by contacts $a$ of two approach track relays designated IAR and 2AR, respectively. In Fig. 2, the despatcher's office panel I, which is arranged to control and indicate the station apparatus of Fig. 3, includes a two-position switch control lever SW for selectively controlling the switch control relay WR at the station, a three-position signal control lever SIG for selectively controlling the signal control relays LHSR and RHSR, and a spring return delivery key DK which may be operated momentarily in order to effect a control of the relays in accordance with the positions of the control levers. The panel also includes a plurality of indication lamps each having the reference E with identifying prefix, such as lamps TE, IAE and 2AE for indicating the condition of the track relays TR, IAR and 2AR, respectively, a pair of switch indication lamps NWE and RWE lighted when the switch occupies its normal or reverse position, respectively, and three signal indication lamps LHE, NHE and RHE each of which when lighted indicates, respectively, that a left-hand signal is at clear, that all signals are at stop, or that a right-hand signal is at clear. Each lamp E is controlled by a polar stick relay designated by the reference K with a prefix corresponding to that of the associated control relay at the field station.

Figure 1:
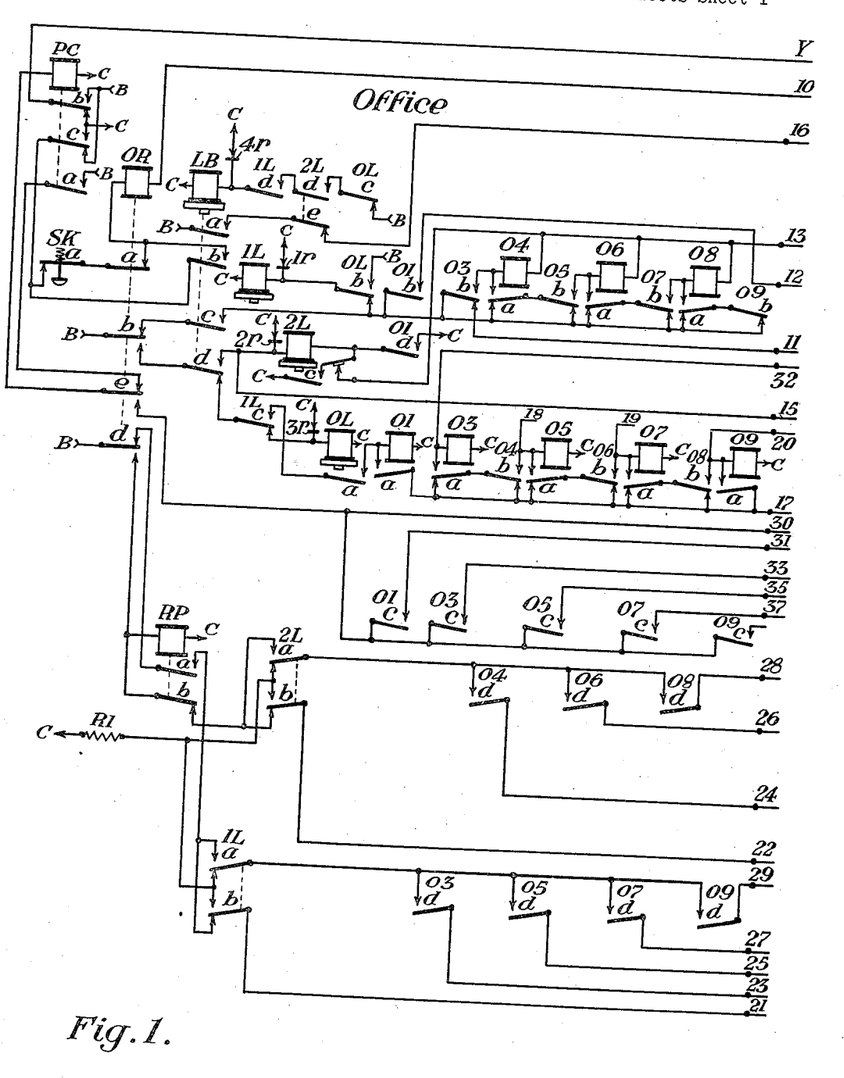

As will be evident from the foregoing, I have in some instances in order to simplify the disclosure illustrated relay contacts on the drawing remote from the relay windings which control them. In every such case, I have applied to the contact the reference character which indicates the relay which operates it, and in addition, I have applied a separate character to each contact of the relay. I have also in each case employed lower case letters for the purpose of designating relay contacts and capital letters or figures to designate relays, thus, for example, relay LB at the left of Fig. 1 has four contacts $a$, $b$, $c$, and $d$, shown directly beneath its winding, and also has a contact $e$ shown at the right of Fig. 2, for controlling relay Z2. The designation LB over this last named contact distinguishes it from all other contacts bearing the designation $e$.

The relay circuits include in a number of instances symmetrical units designated by the reference $r$ with a suitable prefix. Each of these units is so arranged in circuit that it provides a high resistance to the flow of current from the power source and at the same time provides a low resistance closed circuit including the winding of one or more relays, through which the relay current may continue to flow for a time after the power source is disconnected, so that the inductive energy in the relays is discharged gradually and no sparking occurs when the controlling contacts are opened. Certain of the relays are shown conventionally on the drawing as slow release relays, but each of these relays is timed to release slowly because there is a low resistance closed circuit through the relay winding and an asymmetric unit instead of through a separate short-circuited winding or ferrule as is customarily employed. Each of these slow release relays will pick up, when its energizing circuit is closed, in the same time as the usual quick acting relay, because the asymmetric unit then presents a high resistance and there is no short-circuit to retard the building up of current through the relay winding. In the case of relay T in Fig. 3, the asymmetric unit $8r$ associated with the relay is arranged to be connected to the relay winding only when certain control contacts are closed, in the manner illustrated in my prior application hereinbefore referred to, so that relay T at certain times functions as a quick release relay and at other times as a slow release relay.

It is further understood that a local source or sources of direct current are provided at each location but for simplicity I have illustrated the circuits diagrammatically, and instead of showing the local source and the wires leading thereto in detail, I have shown only the terminals of the sources which I have designated in each case by the reference characters B and C.

The relays employed in the remote control apparatus, with the exception of those relays illustrated as polarized relays, may be of any suitable type of quick acting relay such, for example, as the relay illustrated in Patent No. 1,815,947, issued July 28, 1931, to L. V. Lewis. The polarized relays include relays PR and WR at the station and the indication relays K at the office. These are two-position direct current polar relays of the well known permanent magnet stick type, and each is adapted to move its contact to the left or to the right in accordance with the relative polarity of a momentary impulse of current in its winding, the contact remaining closed in its last-operated position when the relay is deenergized.

Before proceeding with a detailed description of the circuits by means of which communication is maintained between the office and the stations, I will first briefly explain the general plan and organization of the system as herein illustrated.

My system fundamentally is a normally at rest synchronous selector composed of chains of relays, which may be set into operation from the office or from any station. When set into operation, the system operates through a cycle during which a series of stepping circuits are closed one at a time in sequence over a control line wire X and a common return wire Y between the office and each station in turn, the apparatus then returning automatically to normal.

For initiating a cycle of operation of the system, a starting circuit is provided, closed when the system is in its normal or at rest condition, and including a source of current, a line relay OR and a contact $a$ of a manually operable starting key SK at the office, the control line wire X, a line relay R and a front contact $c$ of a sectionalizing relay S at each station. The office and station line relays are connected in series in this circuit, which is completed through a jumper 14 connected from the outgoing terminal of wire X at the most remote station to the adjacent outgoing terminal of the common return line wire Y leading back to the other terminal of the source of current at the office. A cycle of operation of the system is initiated by opening this normally closed circuit, either by manually actuating the starting key SK at the office, when station devices are to be controlled, or by the release of a sectionalizing relay S at one of the stations, following the release of a starting relay ST effected when one of the devices at such station changes its position and the transmission of new indications from such station is required in order to actuate the corresponding indication devices at the office into positions in agreement with those of the devices at such station.

At the office, when the normally closed line circuit opens, relay OR is released and the slow release relays OL and IL, the first numbered relay OI of the office chain, and the slow release relay 2L each pick up, relay OL then releases and a slow release bridging relay LB picks up to close its contact $b$ to reestablish the portion of the line circuit leading to the first station. At each station, relay R is released simultaneously with the release of relay OR, and the first numbered relay I of the station chain, a slow release bridging relay L and a transmitter relay T each pick up, and relay S becomes released, if energized, so that the outgoing portion of the line circuit becomes opened at contact $c$ of relay S at each station. The incoming portion in the direction of the office then becomes closed through a shunt of substantially the same resistance as the remainder of the line and including a polarized relay PR and a contact $b$ of relay T. The first of a series of stepping circuits over line wire X is then closed, the first circuit including the source of energy and relay OR at the office and relays R and PR at the first station, to energize relays OR and R to pick up the second chain relay O2' at the office, and the slow release relay LO and the second chain relay 2 at station I. Then relays I and T at station I release, opening the stepping circuit so that relay R releases to pick up relay 3. If there are no devices to be controlled or indicated at the first station, the release of relay OR will cause O3' to pick up, while relay 3 at the station when energized will cause relay S to pick up to close its contact $c$ to establish the second stepping circuit of the series, which extends from the office through the first station and includes relay OR at the office, relay R at station I and relays R and PR at station II. The closing of the second stepping circuit causes relays OR and O2'' at the office, and relays R, PR, OL and 2 at station II to become energized. If no devices are to be controlled or indicated, the stepping progresses step by step in this manner with the transmission of one station selecting impulse per station, and the cycle of operation is completed and the normally closed starting circuit is again closed following the transmission of one such stepping impulse to the most remote station.

In the event, however, that the starting relay ST at any station, has been released due to a change in position of any device at such station, an indication selector relay IS will be picked up at such station at the beginning of the cycle, closing its contact $e$ to include an asymmetric unit $8r$ in the circuit of relay T to delay the release of this relay and thereby prolong the stepping impulse transmitted from such station, for a time sufficient to permit relay 2L at the office to release and thereby cause the energization of the selector relays of the corresponding panel, such as relay S' and SP' of panel I. When selector relays such as IS and S' are energized, a group of additional stepping circuits is included in the series in such a manner that a group of additional impulses, three in number with the system arranged as illustrated is included in the series directly following the station selecting impulse for the corresponding station, and the relative length of these three additional impulses and of the four adjacent intervals between impulses are controlled to effect the transmission of seven indications. A selector relay such as S', when energized, causes relay O3 of Fig. 1 to be operated next in sequence after relay O2', in lieu of relay O3' of Fig. 2, and auxiliary chain relays O4 to O9, inclusive, are then operated in order; relay O3', which transfers the chain operation to the next panel, being operated in unison with O9 in this case. At the station, chain relays 3 to 9 are operated in order, in unison with the office relays of corresponding number, and relay 9 instead of relay 3 operates relay S to transfer the chain operation to the next station. Thus when no devices are to be indicated at a station, there is one impulse and interval per station and all the impulses and intervals are relatively short, but when the devices at a station are to be indicated, the station selecting impulse is prolonged and is followed by additional function selecting impulses and intervals. The relative length of each of these additional impulses is controlled by varying the release time of relay T through the medium of asymmetric unit $8r$ as already described to effect the transmission of the even numbered indications, and the relative length of each interval between impulses is controlled by governing the pick up of relay T through the medium of the slow acting relay LO, to effect the transmission of the odd numbered indications. These indications are registered at the office by momentarily energizing each of the polarized indication relays of the selected panel to one position or another, in accordance with the position of a slow release relay IL or 2L at the end of the controlling impulse or interval.

In the event that the operator desires to effect the control of any of the station devices, he will move the control levers SW and SIG for such devices to the desired positions, and will then operate the delivery key DK of the panel for each station at which such devices are located; and finally will operate the starting key SK to initiate the cycle of operation. The operation of keys DK will cause the corresponding delivery relays, such as relay CD' of panel I, to be energized so that pole-changer relay PC will become energized during the time the station selecting impulses are being transmitted to such stations so that the polarity of the corresponding impulses will be reversed. At the selected stations only, the polarized relays PR will be reversed and the control selector relays CS will become energized. Each relay CS will cause the energization of the corresponding indication selector relay IS and of the panel selector relay such as relay S' or S'', so that additional impulses will be included in the series and indications will be transmitted from the selected station precisely as if the selection had originated at the station as already described, but in this case, the polarity of the additional impulses will be controlled in accordance with the position of the control levers to selectively actuate the switch and signal control relays at the selected station. My system thus provides for the transmission of a series of impulses each of which is employed to actuate a synchronous selector and at the same time to effect the transmission of a control from the office to the station in accordance with its polarity and also to effect the transmission of two separate indications from the station to the office, one of which is selected in accordance with the relative length of the control impulse, and the other in accordance with the relative length of the interval between the control impulse and the next succeeding one. It is to be understood that my system is not restricted to the control of the particular combination of apparatus that I have described, and which may be employed to control any suitable combination of apparatus and that the number of steps per station may be of any desired number and may be different at the different stations.

I will now trace in step by step fashion the operation of my remote control system but will, for simplicity, first describe the station selecting stepping operations only, and will then describe the stepping and indicating operations and then the stepping and control operations.

Connecting the office and each station in turn, I provide a line wire X included in a normally closed line circuit which may be traced from one terminal B of the source of energy at the office, back contact c of a pole-changer relay PC, contact a of starting key SK, contact a and winding of line relay OR, wire 10, contact a of knockdown key CK, to line wire X, thence through the winding of line relay R and front contact c of relay S at each station in turn. The circuit is completed through a jumper 14 connecting the outgoing terminal of wire X at the most remote station to the outgoing terminal of a common return wire Y extending back to the office, thence over back contact b of relay PC to the other terminal C of the source of energy at the office. The system is normally at rest with relay OR at the office and relays R, S and ST at each station energized. I will first assume that the system is set into operation by momentarily opening the starting key SK to release relay OR at the office and relay R at each station. Since the normally closed line circuit includes front contact a of relay OR, it now remains open until this contact is bridged by the closing of contact b of relay LB. When relay OR releases, it closes its back contact b completing a circuit from one terminal B of the local source of energy, back contacts b, d and c of relays OR, LB and IL, respectively, relay OL to the other terminal C of the same source so that relay OL becomes energized. Relay OL picks up and closes a circuit from terminal B, front contact b of relay OL, relay IL, to terminal C, so that relay IL becomes energized. Relay IL picks up and completes a circuit from terminal B, back contacts b and d of relays OR and LB, front contacts c and a of relays IL and OL, relay O1 to terminal C. Relay O1 picks up and completes a branch circuit which is the same as that just traced as far as the left-hand terminal of relay O1 and then extends over front contact a of relay O1, wire 17, back contacts b of relays O2' to O2$^n$ in series, wire 15, relay 2L, front contact d of relay O1 to terminal C, so that relay 2L picks up. When relay IL picks up, the energizing circuit for relay OL is opened, but relay OL remains picked up for a relatively long interval due to the closed circuit through its winding and asymmetric unit 3r, and then releases to remain deenergized during the remainder of the cycle of operation.

When relay OL releases, a circuit is closed from terminal B, back contact c of relay OL, front contacts d of relays 2L and IL, relay LB to terminal C, energizing relay LB. Relay LB picks up and closes a stick circuit for relay O1 from terminal B, back contact b of relay OR, front contact d of relay LB, wire 15, back contacts b of relays O2' to O2$^n$, inclusive, wire 17, front contact a and winding of relay O1, to terminal C, and also closes a circuit for relay 2L from terminal B, back contact b of relay OR, front contact d of relay LB, winding and front contact c of relay 2L to terminal C.

When relay OL releases, the energizing circuit of relay IL is opened, but relay IL does not release at this time by reason of the closed circuit including its winding and asymmetric unit 1r. When relay LB picks up, it closes its contact b and restores the portion of the line circuit at the office, and the office apparatus is now in condition to receive the first impulse from station I.

At each station, relay S is normally energized over a holding circuit extending from terminal B of the local source of energy at the station, front contact a of relay R, front contact c of starting relay ST, back contact a of relay L, front contact a and winding of relay S, to the other terminal C of the same source. When relay R releases due to the initial opening of the line circuit, its front contact a opens to deenergize relay S, and relay S releases to open its contact c in the outgoing portion of the line circuit leading to the next station, and also opens its contact a in its stick circuit. When relay R releases, a circuit is closed from terminal B over back contact a of relay R, back contact b of relay L, relay 1 to terminal C, energizing relay 1. When relay 1 picks up, a circuit is closed from terminal B, back contact a of relay R, back contact b of relay L, front contact a of relay 1, back contact b of relay 2, front contact c of relay 1, relay L to terminal C, so that relay L becomes energized. When relay L picks up, its stick circuit becomes closed from terminal B, back contact a of relay R, front contact b of relay L, contact c of relay 1, relay L, to terminal C, and a stick circuit for relay 1 becomes closed from terminal B, back contact a of relay R, front contact b of relay L, back contact b of relay 2, front contact a and winding of relay 1 to terminal C. When relay I picks up, a circuit is closed from terminal B, front contact $d$ of relay I, relay T to terminal C, so that relay T picks up, closing its contact $b$ to complete the portion of the line circuit extending from the incoming line wire X, relay R, front contact $b$ of relay T, polarized relay PR, compensating resistor R5 to common return wire Y, thereby completing the line circuit from station I to the office to initiate the first station selecting impulse of the series as soon as the line circuit is closed at the office by the pick up of relay LB. When this occurs, relay OR at the office and relay R at station I pick up, the polarized relay PR being energized in this case in such a direction as to maintain its left-hand contacts closed, as shown. At each remaining station the apparatus remains in the condition just described with relay R deenergized and relays I, L and T energized until the incoming portion of the line circuit at such station becomes closed through the intervening stations to the office.

Considering now the first stepping impulse, when relay OR at the office picks up, a circuit is closed from terminal B, front contacts $b$ and $c$ of relays OR and LB, front contact $b$ of relay O1, wire 12, relay O2', to terminal C. Relay O2' picks up, completing its stick circuit extending from terminal B, front contacts $b$ and $c$ of relays OR and LB, back contact $b$ of relay O3, bus wire 11, back contact $b$ of relay O3', front contact $a$ and winding of relay O2' to terminal C. The energizing circuit for relay O1 is opened when relay OR picks up, but relay O1 remains picked up for a short time by reason of the closed circuit from terminal C, the winding and front contact $a$ of relay O1, wire 17, back contacts $b$ of relays O2' to O2$^n$, inclusive, wire 15, asymmetric unit $2r$ to terminal C, and releases when relay O2' picks up to open its back contact $b$ in this circuit. When relay OR picks up, a circuit is closed from terminal B, front contacts $b$ and $c$ of relays OR and LB, back contact $b$ of relay OL, relay IL, to terminal C. Relay IL is reenergized over this circuit each time the line relay OR picks up during the cycle of operation and remains picked up when its energizing circuit is open during short intervals between the line impulses by reason of the closed circuit through its winding and asymmetric unit $1r$, but releases when an interval between impulses is relatively long. When relay OR picks up, the energizing circuit for relay 2L is opened, but relay 2L remains picked up while relay OR is energized during each short impulse of the cycle by reason of the closed circuit including its winding and asymmetric unit $2r$, but releases when an impulse is relatively long. Relay LB remains picked up for the duration of the cycle of operation of the system, even though its energizing circuit is opened at intervals by the release of relays IL or 2L, by reason of the closed circuit through the winding of relay LB and asymmetric unit $4r$.

At station I, when relay R picks up in response to the first impulse of the series, a circuit is closed from terminal B, front contacts $a$ and $d$ of relays R and L, front contact $b$ of relay I, relay 2, back contact $b$ of relay S to terminal C. Relay 2 picks up and closes its stick circuit from terminal B, front contacts $a$ and $d$ of relays R and L, back contact $b$ of relay 3, front contact $a$ and winding of relay 2, to terminal C. The energizing circuit for relay I is now open, but relay I remains picked up by reason of the closed circuit from terminal C, asymmetric unit $1r$, back contact $b$ of relay 2, front contact and winding of relay I to terminal C, which circuit is opened so that relay I releases as soon as relay 2 picks up. When relay R picks up, a circuit is also closed from terminal B, front contacts $a$ and $d$ of relays R and L, relay LO to terminal C, so that relay LO picks up. When relay I releases, it opens at its contact $d$ the circuit for relay T, so that relay T releases and opens the line circuit at its contact $b$ thus terminating the station selecting impulse transmitted from station I to the office, and if, as assumed, there are no devices to be controlled or indicated at the station I, relay T releases quickly and the impulse is relatively short. When relay R picked up, it opened the energizing circuit of relay L, but this relay is a slow release relay and remains picked up by reason of the closed circuit including its winding and asymmetric unit $5r$. Relay L is adjusted to have a maximum release period, so that, like relay LB at the office, it remains picked up for the duration of the cycle of operation of the system.

When relay R releases at the end of the first impulse, a circuit is closed from terminal B, back contact $a$ of relay R, front contact $b$ of relay L, back contact $a$ of relay I, front contact $b$ of relay 2, relay 3, back contact $e$ of relay I to terminal C, so that relay 3 picks up, closing an obvious stick circuit for relay 3. A circuit is also closed from terminal B, back contact $a$ of relay R, front contacts $b$ and $c$ of relays L and LO, relay L to terminal C, so that relay L is reenergized. The energizing circuit of relay LO is now open, but this relay remains picked up by reason of the closed circuit including its winding and asymmetric unit $6r$ when the interval between impulses is relatively short, as in this case. The energizing circuit for relay 2 is now open, but relay 2 remains picked up by reason of the closed circuit from terminal C, asymmetric unit $6r$, back contact $b$ of relay 3, front contact $a$ and winding of relay 2, back contact $b$ of relay S to terminal C, which circuit is opened so that relay 2 releases when relay 3 is picked up.

When relay 3 picks up, a circuit is closed from terminal B, back contacts $d$ of relays CS and IS, front contact $c$ of relay 3, relay S to terminal C, so that relay S picks up to close its contact $c$ to extend the line circuit from the office to the next succeeding station to initiate the second station selecting impulse of the series.

When relay S picks up it closes its stick circuit from terminal B, front contacts $a$ of relay L, front contact $a$ and winding of relay S to terminal C, so that relay S is held energized by relay L for the remainder of the cycle of operation.

At the office, when relay OR is released at the end of the first impulse, a circuit is closed from terminal B, back contact $b$ of relay OR, front contact $d$ of relay LB, wire 15, front contact $b$ of relay O2', back contact $d$ of relay S', relay O3' to terminal C, so that relay O3' picks up, completing a stick circuit from terminal B, back contact $b$ of relay OR, front contact $d$ of relay LB, wire 15, back contacts $b$ of the panel relays O2' to O2$^n$, inclusive, wire 17, front contact $a$ and winding of relay O3' to terminal C. The energizing circuit for relay O2' is now open, but relay O2' remains picked up by reason of the closed circuit from terminal C, asymmetric unit $1r$, back contacts $b$ of relays OL and O3, wire 11, back contact $b$ of relay O3', contact $a$ and winding of relay O2' to terminal C, which circuit is opened so that relay O2' releases when relay O3' picks up.

The office apparatus is now in condition to receive the second impulse of the series from station II, and when relay S at station I picks up, the second stepping circuit of the series becomes closed through relay OR at the office, relay R at station I and relays R and PR at station II.

When relay OR picks up, in response to the stepping impulse from station II, it closes a circuit from terminal B, front contacts b and c of relays OR and LB, back contact b of relay O3, wire 11, front contact b of relay O3', relay O2'' of panel II to terminal C, so that O2'' picks up. When relay O2'' picks up, it opens at its back contact b the stick circuit for relay O3' so that O3' releases. The release of relay O3' and of each of the remaining chain relays is controlled by asymmetric unit 2r or 1r at the office, or by 7r or 6r at the station, in the manner already described in connection with relays O1 and O2' at the office and relays 1 and 2 at the station.

At station II, the operations occurring during the transmission of the second station selecting impulse of the series are similar to the operations already described as occurring at station I during the transmission of the first impulse, while at the office, the second impulse controls chain relays of panel II in the same way as the first impulse controlled the chain relays of panel I.

At each station, when relay R picks up in response to the transmission of the station selecting impulse to the next succeeding station, relay 3 releases, but relay 4 does not pick up because its circuit is open at back contact b of relay S. Relays 4 to 9, inclusive, therefore do not operate at any station in response to the transmission of impulses from more remote stations. Relay L, however, is energized during each interval, and as already pointed out remains picked up so that relay S is held picked up.

It is therefore clear that the stepping operations will proceed panel by panel and station by station until relay S becomes energized at the most remote station whereupon the normally closed starting circuit will again be restored. When this occurs, relay OR at the office picks up and completes a circuit over wire 11 to energize relay O2$^n$. Since relay OR now remains steadily energized, relay 2L releases and opens the circuit of relay LB. Relay LB releases at the end of its time period and opens the circuits of relays IL and O2$^n$. When relays IL and O2$^n$ release, the apparatus at the office is again in its normal or at rest condition.

At each station, when relay R becomes steadily energized at the end of the cycle of operation, relay L is deenergized and releases at the end of its time period to open its contact d so that relay LO is released, and relay L closes its back contact a to complete the normal holding circuit of relay S as already described. The apparatus at each station is now in its normal or at rest condition.

I will now assume that the system has been set into operation as a result of some change in conditions at station I, such for example, as the deenergization of relay 2AR at that station. The station starting relay ST is normally energized over a stick circuit from terminal B which includes in series alternatively the front or back contacts c of each of the relays already referred to which control the transmission of indications, such as relay 2AR, as will be obvious from Fig. 3, and this circuit is opened during the interval of travel of contact c of the controlling relay such as relay 2AR when such relay picks up or releases. Relay ST is a relatively quick acting relay normally energized but slightly above its release point by reason of a resistor R6 in its stick circuit so that it releases with certainty during the interval in question, and its stick circuit then is maintained open at front contact a of relay ST. Relay ST at station I therefore is released when relay 2AR becomes deenergized, and contact c of relay ST in the stick circuit of relay S opens, releasing relay S to open the normally closed line circuit and initiate a cycle of operation.

The cycle is in this instance generally similar to that already described, except that, when relays L and 1 at station I become energized, a circuit is closed from terminal B over front contacts e of relays L and 1, back contact d of relay ST, indication selector relay IS, to terminal C, so that relay IS picks up and closes its stick circuit from terminal B, front contact e of relay L, front contact a and winding of relay IS, to terminal C. Relay ST now becomes energized over a circuit from terminal B, front contacts e of relays L and 1, front contact b of relay IS, relay ST, to terminal C, so that relay ST picks up to reestablish its normally closed stick circuit. In this case, when relay 1 releases during the station selecting impulse transmitted by station I, relay T does not immediately release, for the reason that a circuit is then closed from terminal C, asymmetric unit 8r, front contact e of relay IS, front contact d of relay 2, back contact d of relay 1, relay T to terminal C, so that relay T remains picked up due to the closed circuit through its winding and asymmetric unit 8r for a relatively long period, thereby prolonging the station selecting impulse transmitted by station I. At the office, relay OR is held energized by this impulse for a sufficient time to effect the release of relay 2L and thereby close a circuit from terminal B, front contact a of relay LB, back contact e of relay 2L, wire 16, front contact c of relay O2', relay S' to terminal C. Relay S' picks up and closes a stick circuit from terminal B, contact b of key CK, wire 34, back contact d of relay O2'', front contact a and winding of relay S' to terminal C. Relay S' opens its back contact d in the pickup circuit for relay O3' of Fig. 2 and closes its front contact e in the pickup circuit of relay O3 of Fig. 1. When relay S' picks up, it closes a circuit for its repeater relay SP' from terminal B, front contact f of relay S', relay SP' to terminal C, thereby connecting the indication relays of panel I over contacts a to g, inclusive, of relay SP' to a series of bus wires 23 to 29, inclusive, leading respectively to contacts d of relays O3 to O9, inclusive. When relay OR releases at the end of the station selecting impulse, a circuit is closed from terminal B, back contact b of relay OR, front contact d of relay LB, wire 15, front contacts b and e of relays O2' and S', wire 32, relay O3 to terminal C. Relay O3 picks up and closes a stick circuit which is the same as that of relays O1 and O3' from terminal B to wire 17, and then extends over back contact b of relay O4, front contact a and winding of relay O3, to terminal C. Relay O3 opens its back contact b in the stick circuit of relay O2' so that relay O2' releases. When relay OR released it also closed a circuit for its repeater relay RP from terminal B, back contact d of relay OR, relay RP to terminal C. This circuit is opened each time relay OR picks up during the cycle of operation, but relay RP remains picked up for a short time after its circuit is opened to momentarily complete a circuit over its front contact a, and each time relay OR becomes deenergized, relay RP remains in its release position for a short time after its circuit is closed to momentarily complete a circuit over its back contact b.

At station I, when relays T and R release at the end of the first station selecting impulse, relay 3 becomes energized as already described, but in this case, relay S does not become energized because its pickup circuit is now open at back contact d of relay IS. When relay 3 picks up, relay 2 is released and a circuit is closed from terminal B, over front contact f of the signal indication relay RGP, front contact a of relay 3, back contacts d of relays 2 and 1, relay T, to terminal C, so that relay T picks up, closing a stick circuit from terminal B, front contact e of relay 3, front contact a and winding of relay T, to terminal C. Relay T now closes its front contact b to transmit the first of a group of function selecting impulses from station I, comprising additional impulses inserted in the cycle between the first and the second station selecting impulses. Since in this case relay T is picked up by relay RGP immediately after relay 3 picks up, the interval between the station selecting impulse and the first additional impulse is relatively short and relay IL at the office remains picked up, so that, when relay OR picks up in response to the first additional impulse, a circuit is closed momentarily from terminal B, front contacts d and a of relays OR and RP, front contact a of relay IL, front contact d of relay O3, wire 23, front contact g of relay SP', relay RGK, wire 21, front contact b of relay IL, resistor R1 to terminal C, to energize the polar stick indication relay RGK in such direction as to close its left-hand contact to complete an obvious circuit to light lamp NHE or LHE, thereby indicating that contact f of relay RGP is closed.

If contact f of relay RGP at station I had been open, the circuit just described for picking up relay T to produce a short interval following the first station selecting impulse would have been open, and in this case, relays R and OR would have remained deenergized until relay LO at station I released, and when relay LO released a circuit would have been closed from terminal B, front contact e of relay 3, back contact b of relay LO, relay T, to terminal C, so that in this case, the interval would have included the release period of relay LO and would have been relatively long so that relay IL at the office would have released to reverse its pole-changer contacts a and b before relay OR picked up at the end of the interval. The momentary indication impulse would then have been in the opposite direction from that described, and would have energized relay RGK in the opposite direction to close its right-hand contact to light lamp RHE over an obvious circuit to indicate that contact f of relay RGP is open.

When relay OR picks up at the beginning of the first function selecting impulse as just described, it also closes a circuit from terminal B, front contacts b and c of relays OR and LB, front contact b of relay O3, relay O4, wire 13, front contact b of relay S' to terminal C, so that relay O4 picks up and opens its back contact b to release relay O3.

At the station, when relay R picks up in response to the first function selecting impulse, relay 4 picks up and relay 3 is released, as will be obvious from the drawings in view of the foregoing description of the similar operation of relay 2. The release of relay 3 causes relay T to become deenergized to release quickly, thereby producing a short impulse. If, however, front contact b of relay TS had been closed, relay T would have remained picked up to prolong the impulse by reason of the closed circuit from terminal C, asymmetric unit 8r, contact b of relay TS, front contact d of relay 4, back contacts d of relays 2 and 1, relay T, to terminal C, which circuit functions in a manner similar to the circuit for relay T including front contact d of relay 2 already described.

At the office, since this impulse is short, relay 2L does not release, and when relay OR releases at the end of the impulse, a circuit is closed momentarily from terminal B, back contacts d and b of relays OR and RP, front contact a of relay 2L, front contact d of relay O4, wire 24, front contact c of relay SP', relay TK, wire 22, front contact b of relay 2L, resistor R1, to terminal C, so that relay TK is momentarily energized in the direction to move its contact to the left, indicating that contact b of relay TS at the station is open. However, if contact b of relay TS had been closed, the release of relay T would have been delayed as described and the impulse prolonged until relay 2L released, and in this case, when relay OR released at the end of the impulse, the pole-changer contacts a and b of relay 2L would have been in the opposite position so that relay TK would have been energized by a momentary impulse in the opposite direction from that described, to move its contact to the right to close an obvious circuit to light lamp ITE, indicating that contact b of relay TS at the station is closed. When relay OR releases at the end of the first function selecting impulse, a circuit is closed from terminal B, back contact b of relay OR, front contact d of relay LB, wire 15, back contacts b of relays O2' to O2$^n$, inclusive, wire 17, back contact a of relay O3, front contact b of relay O4, relay O5. The stepping operations continue with the transmission of the second and third function selecting impulses and intervening intervals, and relays 5 to 9, inclusive, at the station pick up to close their contacts d one at a time in turn to time the impulses, while relays O5 to O9, inclusive, at the office pick up to close their contacts d to effect the momentary energization of each of the indication relays of the selected panel, one at a time, in turn.

At the station, when relay 9 picks up at the beginning of the interval following the third function selecting impulse, there is no circuit available for picking up relay T. If the switch is normal so that the switch indication relay NKR is energized, the line circuit now remains open to prolong the interval until relay LO releases and a circuit is then closed from terminal B, back contact a of relay LO, back contact c of relay 8, front contact c of relay 9, jumper 34, relay S to terminal C. Relay S picks up to terminate the interval and initiate the transmission of the station selecting impulse from the next succeeding station. If the switch is open or reversed, so that relay NKR is released, back contact a of relay LO in the circuit just described is bridged by back contact f of relay NKR so that relay S' picks up as soon as relay 8 releases and the interval is short.

At the first station, when relay R picks up in response to the station selecting impulse for the next station, relay 9 releases. No further operations occur at the first station during the remainder of the cycle except the repeated operation of relay R to maintain relay L picked up, and when relay R becomes steadily energized, relays L, IS, and LO release to restore the station apparatus to normal.

At the office, when relay O9 picks up during the interval following the third function selecting impulse of a group, relay O3' is also energized over a branch of the pickup circuit of relay O9 which extends from the left-hand terminal of relay O9, wire 26, front contact d of relay S', relay O3' to terminal C, so that in this case relays O9 and O3' pick up at the same time. The next impulse transmitted is the station selecting impulse for the next succeeding station, and it is clear that after relay O3' is picked up the stepping operations will continue as already described and that the next chain relay operated will be relay O2" of the next panel.

When relay O2" picks up, its back contact b opens the stick circuit of relay O9, while its back contact d opens the stick circuit of relay S' of the preceding panel so that relay S' releases and opens the circuit of relay SP' to disconnect the indication relays of the preceding panel from the bus wires 23 to 29, inclusive, thus restoring the apparatus of panel I to normal.

The stepping operations continue in this manner until the cycle of operation is completed, with the transmission of at least one impulse from each station and with the transmission of additional impulses from each station having new indications to transmit, the remaining operations of the cycle being merely a repetition of operations already described.

It will be clear that as the stepping operations continue, that if relay IS at a station is deenergized when the station selecting impulse from that station is transmitted, the impulse will be short and the next succeeding impulse will be the station selecting impulse for the next station, while if relay IS at that station is energized at the time, the impulse will be prolonged, and additional function selecting impulses from that station will precede the station selecting impulse for the next station. Thus if a change occurs at a station after a cycle has started but before the station selecting impulse for that station is reached, the cycle will thus include the indications from that station and the starting relay ST for that station will be reenergized. If however the change occurs after the station has been passed in the cycle, relay ST will remain deenergized so that when relay L releases at the end of the cycle, the holding circuit for relay S at that station will be opened at contact c of relay ST so that relay S will release to initiate a new cycle of operation.

For purposes of illustration, I have described an arrangement employing three function selecting impulses and transmitting a total of seven indications per station. The number of indications, however, may be any desired number at different stations; the number of chain relays at any station may be extended to any desired number in an obvious manner, and the office relays O3 to O9, inclusive, in Fig. 1 may be similarly extended, or the number of chain relays employed at the station may be less than the number shown in Fig. 3. Thus when but one or two function selecting impulses are employed at a station, but three or five indications, respectively, will be available from that station, and jumper 34 at that station will be moved so as to connect the pickup circuit for relay S to contact c of relay 5 or of relay 7 instead of to contact c of relay 9, and the pickup circuit for relay O3' of the corresponding panel will be connected to wire 18 or to wire 19, as the case may be, instead of to wire 20.

I will next assume that the system has been set into operation by the operator at the office for the purposes of controlling the devices at one or more of the stations, including those devices at the station I, and that he has moved the switch and signal levers SW and SIG of the corresponding panels to the proper positions, and has momentarily closed the delivery keys DK of these panels. I will also assume that he has operated key SK to initiate the cycle of operation, as already described. When each key DK is operated, a circuit is closed to energize a corresponding delivery relay CD, such as the circuit of relay CD' of panel I, which may be traced from terminal B, contact a of key DK, back contact c of relay S', relay CD' to terminal C. Relay CD' picks up and completes its stick circuit from terminal B, back contact b of key CK, wire 34, back contact d of relay 2", front contact a and winding of relay CD' to terminal C.

In this case, when the line is opened as the result of the operation of key SK, and relay O1 picks up, a circuit is closed from terminal B, front contact b of relay CD', wire 31, front contact c of relay O1, back contact e of relay OR, pole-changer relay PC, to terminal C, so that relay PC picks up. When the line becomes closed to transmit the station selecting impulse from station I, the polarity of this impulse will be reversed by reason of the reversed position of the pole-changer contacts b and c of relay PC in the line circuit, and when relay OR picks up, relay PC will remain energized by reason of its stick circuit from terminal B, front contact a of relay PC, front contact e of relay OR, relay PC, to terminal C.

At station I, polarized relay PR will now be energized by current in a reverse direction to close its right-hand contacts completing a circuit from terminal B, contact b of relay PR, front contact e of relay 2, control selector relay CS to terminal C, and relay CS will pick up to close its stick circuit from terminal B, front contact e of relay L, and front contact a and winding of relay CS to terminal C. A circuit is now closed from terminal B, front contact e of relay L, front contact c of relay CS, relay IS, to terminal C, so that relay IS will pick up and will cause the station selecting impulse at station I to be prolonged in the same way as when the cycle of operation was initiated by the station, causing relay S' of panel I to pick up, so that three additional impulses will be transmitted from station I to actuate each of the indication relays of panel I each in accordance with the position of its control contact, as already described.

If, now, switch lever SW is in its reverse or R position, when relay O3 picks up a circuit will be closed from terminal B, front contact b of relay CD', front contact i of relay SP', right-hand contact R of switch lever SW, wire 33, front contact c of relay O3, back contact e of relay OR, relay PC, to terminal C, so that relay PC will become energized and the first function selecting impulse transmitted from station I for energizing relay 4 will be of reverse polarity.

At station I, relay PR will be energized in the reverse direction so that a circuit will be closed from terminal B, right-hand contact b of relay PR, contact b of relay CS, contact e of relay 4, switch control relay WR, contact a of locking relay LR, right-hand contact a of relay PR to terminal C, so that relay WR will become energized in the reverse direction to reverse the track switch at station I. If, now, the switch lever SW of the panel had been in its normal position, as shown in the drawings, the circuit over wire 33 for relay PC would have been open so that relay PC would have been deenergized when the first function selecting impulse was transmitted and this impulse would have been of normal polarity to cause relay PR to close its left-hand contacts and relay WR in this case would have been energized with current of normal polarity to correspond with the normal position of switch lever SW. In a similar manner, the control of the polarity of the second and third function selecting impulses is effected through the medium of relay PC by circuits which are obvious from the drawing and which includes wires 35 and 37, the left and right-hand contacts L and R, respectively, of the signal lever SIG, and contact h of relay SP'. It is clear that both of these impulses will be of normal polarity when lever SIG is in the middle or stop position, as shown, and that one or the other of the impulses will be of reverse polarity when the lever is in its left or right-hand position as indicated by the references L and R adjacent the lever.

If the second function selecting impulse for energizing relay 6 at the station is of reverse polarity, relay PR will be energized to close its right-hand contacts, and a circuit will be closed from terminal B, right-hand contact b of relay PR, front contact b of relay CS, contact e of relay 6, relay LHSR to terminal C, and relay LHSR, if deenergized, will pick up to close its stick circuit from terminal B, front contact b of relay TR, resistor R3, back contact b of relay RHSR, front contact a and winding of relay LHSR to terminal C, so that relay LHSR will become energized and other contacts of relay LHSR, not shown, will become closed to control the corresponding signal in the usual manner. If, on the other hand, relay LHSR is energized over its stick circuit, it may be released by moving lever SIG to the middle position, and in this case, relay PR will be energized in the normal direction by the second function selecting impulse, so that, when relay 6 picks up, a circuit will be closed from terminal C, left-hand contact b of relay PR, front contact b of relay CS, front contact e of relay 6 to the left-hand terminal of relay LHSR to short-circuit the winding of this relay and thereby cause it to become released. Relay LHSR may also be released automatically by the passage of a train through the detector track section. When this occurs, relay TR becomes released to open its contact b in the stick circuit of relay LHSR to cause the release of relay LHSR. Relay TR at the same time deenergizes its slow acting repeater relay TZ and the latter relay releases after a time period to close its back contact a to connect terminal B of the local source of current to the stick circuit of relay LHSR, and relay LHSR may then be picked up in the manner described and will be held energized over the stick circuit including back contact a of relay TZ. Relay RHSR is controlled in a similar manner and is picked up or released in the same way during the third function selecting impulse when relay 8 is energized, as is obvious from the drawings.

As in my hereinbefore mentioned prior application, I provide a repeater relay TS for controlling the transmission of indications of the condition of the detector track relay TR in order to guard against the possible loss of a track occupied indication in the event that relay TR becomes deenergized for a very brief period. When relay TR becomes deenergized, a circuit is closed from terminal B, back contact b of relay TR, relay TS, to terminal C, so that relay TS picks up and momentarily opens its contact c to release the starting relay ST to initiate the cycle of operation. Relay TS will now remain energized even though relay TR picks up by reason of its stick circuit from terminal B, back contact b of relay ST, front contact and winding of relay TS to terminal C. When relay ST is picked up at the beginning of the cycle of operation, another stick circuit for relay TS is closed from terminal B, front contact c of relay L, front contact b of relay ST, front contact a and winding of relay TS to terminal C so that relay TS remains energized until relay L is released at the end of the cycle even though relay TR has picked up, thereby insuring that front contact b of relay TS will be effective to transmit the track occupied indication. Thus if relay TR picks up before the cycle of operation is completed, relay TS will not release until the end of the cycle is reached, and it will then open contact c momentarily to release relay ST to initiate a new cycle of operation. It is thus evident that each release of relay TR irrespective of its duration will cause the transmission of a track occupied indication, and that the succeeding energization of relay TR will cause the transmission of a track clear indication.

The operation of the system after the transmission of the third additional impulse is in this case similar to that already described, the next impulse being the station selecting impulse for the next station.

If any additional delivery relays at the office have been operated, relay PC will be energized for the duration of the corresponding station selecting impulses to pick up the control selector relays CS at the corresponding stations. Thus, assuming that relay CD'' of panel II is energized, a circuit will be closed during the interval preceding the station selecting impulse for station II, which may be traced from terminal B, front contact b of relay CD'', front contact c of relay O3', wire 30, back contact c of relay OR, relay PC to terminal C so that PC will pick up to reverse the polarity of the station selecting impulse for that station.

It is to be noted that any station selector relay CS which is picked up becomes released when the associated relay IS is released at the end of the cycle. Any office delivery relay such as CD' which is picked up becomes released when the associated panel selector relay S' is released; that is, when the chain relay for the next panel, such as relay O2'', picks up.

One feature of my invention consists of the provision of means for cancelling a control cycle of operation after it has been initiated. This result may be accomplished by operating the knock-down key CK to open its contact a in the line circuit for a period sufficient to release all of the bridging relays L and LB, this operation, due to the opening of contact b of key CK, also effecting the release of any of the relays S' or CD' that may be energized, to thereby cancel the station selection. The release of relay LB reenergizes relay OL, and the release of relay L at each station reenergizes relay I at that station, so that the apparatus assumes the same condition as when the line is initially opened at the beginning of a cycle. It follows therefore, that when key CK is released to close its contacts, the first impulse of a cycle will be initiated and the stepping operations will then continue in a normal manner to complete the cycle, but without effecting any control operations.

From the foregoing description of the operation of the stepping circuits, it is evident if the line circuit becomes opened due to any accidental cause such as a wire failure, a cycle of operation will be initiated which will progress to the point of failure and will be then terminated by an open circuit interval prolonged until relay L at each station on the office side of the point of failure is released, relay LB at the office also being released within this period. When this occurs, the apparatus at the office and at these stations assumes the same conditions as at the beginning of a cycle so that the stepping operations just described will be repeated. It follows that when the apparatus is unable to complete a cycle it will operate repeatedly through the available portion of the cycle.

To indicate to the operator when the system is out of order or when abnormal operations occur, I provide at the office a lamp CE controlled by a front contact $b$ of a relay ZI, which relay is controlled by a second relay Z2 and by the final relay $O2^n$ of the office chain of relays. Relay Z2 is normally energized over back contact $e$ of relay LB and is therefore released when the stepping is in progress. If the stepping is interrupted so that LB is released before a cycle is completed, a circuit is closed momentarily from terminal B, back contacts $e$ and $a$ of relays IB and Z2, back contact $c$ of relay $2^n$, relay ZI, to terminal C, so that relay ZI picks up to light lamp CE. A circuit is also closed from terminal B, back contact $e$ of relay LB, relay Z2, to terminal C, to energize relay Z2 to open the pick up circuit for ZI, but relay ZI remains energized by reason of its stick circuit now closed from terminal B, contact $b$ of key CK, front contact and winding of relay ZI to terminal C. Relay ZI may be released and lamp CE extinguished by operating the key CK to start a new cycle as already described. At the end of a normal or completed cycle, relay $O2^n$ is picked up to open its contact $c$ in the pick up circuit of relay ZI before relay LB releases, so that relay ZI is not picked up in this case.

Relay ZI also operates to light lamp CE in the event the office and station chains of relays get out of step; for example, if the station relays complete the cycle before relay $O2^n$ picks up, the above-described pickup circuit for relay ZI will be momentarily closed when relay LB releases. If relay $O2^n$ is picked up before the station relays complete the cycle, an additional operation of relay OR will ensue and a pickup circuit for relay ZI will be closed from terminal B, back contact $b$ of relay OR, front contact $d$ of relay LB, wire 15, back contacts $b$ of the panel relays $O2'$, $O2''$ in series, front contact $c$ of relay $O2^n$, relay ZI to terminal C, so that in either case, if the office relays complete a cycle out of step with the station relays, lamp CE will become lighted.

Although I have herein shown and described only one form of apparatus embodying my invention, it is understood that various changes and modifications may be made therein within the scope of the appended claims without departing from the spirit and scope of my invention.

Having thus described my invention, what I claim is:

1. A centralized traffic control system of the synchronous selector type comprising an office and a plurality of stations, a single line wire connecting said office and stations, a plurality of traffic controlling devices including one or more at each station, a station selector for each station, an indicator at the office for each device, stepping apparatus for transmitting a series of timed impulses of current each of selected polarity and spaced by timed intervals of no current over said line wire from the office to each station in turn during a single cycle of operation of said apparatus, said series including a station selecting impulse for each station and a group of one or more function selecting impulses for each of one or more selected stations, means at the office operable to control the relative polarity of selected impulses of said series to select the stations at which devices to be controlled are located and to effect the control of such devices, means effective to control each station selector and a plurality of devices at a selected station each in accordance with the relative polarity of a particular impulse of the series, means effective at each selected station to control the relative length of selected impulses and of selected intervals between impulses in accordance with the condition of devices at such station, and means effective to control the indicators for the devices of each station of which the station selector is actuated, each in accordance with the relative length of a particular impulse or interval between impulses of said series.

2. In combination, a normally closed circuit including a line wire connecting a control office and a plurality of remote stations, a series of movable devices including one or more at each station, a series of indicators at the office including one for each device, a station selector for each station, means set into operation by a change in position of one or more of said devices for opening said circuit, means rendered effective by the opening of said circuit to transmit a series of timed impulses of current spaced by timed intervals of no current over said line wire from the office to each station in turn, said series including a station selecting impulse for each station and a group of one or more impulses for each station at which a device has changed its position, means effective at each such station for controlling the relative length of the station selecting impulse for such station to actuate its station selector and for controlling the relative length of the impulses and intervals between impulses, and means effective to control the indicator for each device at each station of which the station selector is actuated, each in accordance with the relative length of a particular impulse or interval between impulses of said series.

3. In combination, a normally closed circuit including a line wire connecting a control office and a plurality of remote stations, a series of movable devices including one or more at each station, a station selector for each station, manually operable means for opening said circuit, means set into operation by the opening of said circuit to transmit a series of impulses each of selected polarity over said line wire from the office to each station in turn, said series including a station selecting impulse for each station and an operating impulse for each device at one or more selected stations, means at the office operable to control the relative polarity of selected impulses of said series to select the stations at which devices to be controlled are located and to effect the control of such devices, and means effective to control each station selector and each device at a selected station each in accordance with the relative polarity of a particular impulse of the series.

4. In a remote control system, an office and a plurality of stations connected by a line wire, a series of movable devices including one or more at each station, indication means at the office for each device, means set into operation by a change in position of any one of said devices for transmitting an impulse of current over said line wire from the office to the nearest station, means at each station responsive to an impulse of current received over said line wire and effective when each device at such station and its indication means are in corresponding positions for transmitting an impulse of current over said line wire from the office to the next succeeding station, means at each station for modifying the impulse transmitted to such station when a device at such station has moved to a position out of correspondence with the position of its indication means, means responsive to a modified impulse for transmitting additional impulses over said line wire from the office to such station, and means for controlling said additional impulses to actuate the indication means for the devices at such station, each to a position corresponding to that of its device.

5. In a remote control system, an office and a plurality of stations connected by a line wire, a series of movable devices including one or more at each station, indication means at the office for each device, a starting relay at each station, means responsive to a change in position of any one of said devices for actuating the starting relay at the corresponding station, means set into operation when any starting relay is actuated for transmitting an impulse of current over said line wire from the office to the nearest station, means at each station responsive to an impulse of current received over said line wire and effective when the starting relay at such station is in its non-actuated condition for transmitting an impulse of current over said line wire from the office to the next succeeding station, means at each station for modifying the impulse transmitted to such station when the starting relay at such station has been actuated, means responsive to a modified impulse for transmitting additional impulses over said line wire from the office to such station and for restoring the starting relay at such station, and means for controlling said additional impulses to actuate the indication means for the devices at such station, each to a position corresponding to that of its device.

6. A remote control system comprising an office and a plurality of stations connected by a line wire, a transmitter contact at each station, means at each station effective to close the contact at such station to transmit a single impulse of current over the line wire to the office when said line wire is available, means at each station effective at times to open the contact at such station to terminate said impulse, and to then close the line wire from the office through such station to render said line wire available at the next succeeding station, means at each station effective at other times to open said contact repeatedly to transmit a group of impulses from such station and to then close the line wire from the office through said station to render said line wire available at the next succeeding station, a plurality of indication devices at the office for each station, and means effective when an additional group of impulses is transmitted for controlling certain of said devices, each in accordance with the relative length of a particular impulse of said group.

7. A remote indication system comprising a plurality of devices distributed in groups of variable number at spaced points, a single line wire connecting each of said groups with a control office, impulse transmitting means adapted to be controlled over said line wire, means responsive to a change in condition of any of said devices to set said impulse transmitting means into operation to transmit a series of impulses, one to each group in turn, means responsive to a change in condition of any of said devices to prolong the impulse transmitted to the corresponding group, means responsive to such prolonged impulse to cause the impulse transmitting means to include additional impulses in said series including one for each device in such group, means for governing the length of each such additional impulse in accordance with the condition of the corresponding device, a series of indicators at the office, one for each device, and means for selectively controlling each of said indicators in accordance with the length of the impulse governed by the corresponding device.

8. A remote control system comprising a plurality of devices distributed in groups of variable number at spaced points, a single line circuit connecting each of said groups with a control office, impulse transmitting means adapted to operate through a series of steps to transmit impulses over said line circuit, manually controlled means at the office operable to set said impulse transmitting means into operation to transmit a series of impulses, comprising one impulse for each group of devices, a manually operable key for each group, means effective when the key for a selected group has been operated to cause the impulse transmitting means to operate through additional steps to interpose as many additional impulses in said series as there are devices in such group, manually operable means for selectively controlling the character of each such additional impulse, and means for controlling each device in said selected group each in accordance with the character of a different one of said additional impulses.

9. In a centralized traffic control system, the combination of a control office and a plurality of way stations, of a master synchronous selector at the office, a wayside synchronous selector having a series of elements each corresponding to a different element of the office selector, a portion of said series being located at each way station, said selectors including stepping means for placing each element of the office selector in turn in contact with a corresponding element of a way station selector, and means controlled in accordance with the length of time each element of the office selector is maintained in contact with a corresponding element of the wayside selector for determining whether or not circuits for communicating between the office and such station are to be established.

10. In a remote control system, an office and a plurality of stations connected by a normally closed series line circuit including a line relay at each station, means for opening said circuit, means rendered effective when the line relay at each station is released to open the portion of the line circuit leading from such station to the next succeeding station and for shunting through a polarized relay the portion of the line circuit leading to the office, a selector relay at each station, restoring means at each station operable to restore the portion of the line circuit from the office through such station to the next succeeding station, means rendered effective when said polarized relay is energized in one direction for energizing said selector relay and when said polarized relay is energized in the other direction for operating said restoring means, stepping means at each station controlled by the line relay at such station, and means controlled by said stepping means in response to repeated operations of said line relay for operating said restoring means.

11. In a remote control system, two stations connected by a line circuit, a line relay at each station, a transmitter relay at one station having a contact controlling the energization of said line circuit, an energizing circuit for said transmitter relay, means controlled by the associated line relay for repeatedly closing and opening said energizing circuit to produce a series of timed impulses of current spaced by timed intervals of no current in said line circuit, means for at times delaying the release of said transmitter relay after its energizing circuit is opened to prolong certain of said impulses, means for at times delaying the closing of said energizing circuit to prolong certain of said intervals, a series of two position indicators at the other station including one for each impulse and one for each interval of said series, and means controlled by the line relay at said other station for actuating each of said indicators in turn to one position or the other each in accordance with the relative length of a particular impulse or interval of said series.

NORMAN F. AGNEW.